United States Patent [19]
Freyermuth

[11] 3,739,741
[45] June 19, 1973

[54] TRANSMISSION GEARSHIFT INDICATOR

[75] Inventor: William J. Freyermuth, Rochester, Mich.

[73] Assignee: General Motors Corporation, Detroit, Mich.

[22] Filed: Nov. 15, 1971

[21] Appl. No.: 198,565

[52] U.S. Cl.................... 116/124, 74/10.7, 74/501
[51] Int. Cl. ........................................... G09f 9/00
[58] Field of Search .................. 116/70, 114, 124, 116/124.1, 117, 129 R, 129 X, 135, 129 A-129 T, DIG. 6, DIG. 23, DIG. 20; 74/475, 484, 493, 552; 180/90; 177/233

[56] References Cited
UNITED STATES PATENTS

| 2,732,905 | 1/1956 | Anderson et al. ..................... 180/90 |
| 2,737,147 | 3/1956 | Bliss................................. 116/124 R |
| 2,925,061 | 2/1960 | Thornburgh et al. ........... 116/124 R |
| 3,084,659 | 4/1963 | Griffen............................. 116/124 R |
| 3,229,780 | 1/1966 | Hanssen............................. 177/233 |
| 3,530,820 | 9/1970 | Morgenroth................. 116/129 AB |
| 3,554,158 | 1/1971 | Shimano ......................... 116/124 R |

FOREIGN PATENTS OR APPLICATIONS

| 1,269,706 | 7/1961 | France........................... 116/DIG. 6 |

Primary Examiner—Louis J. Capozi
Attorney—W. E. Finken and W. A. Schultz

[57] ABSTRACT

A transmission gearshift indicator for a transmission control system is disclosed as comprising a housing means with a dial associated therewith with spaced representations corresponding to different transmission settings, a spring means which has one end fixed to the housing means, and a pointer which is mounted between the ends of the spring means and which projects it to a position adjacent the dial to provide a visual indication of the transmission setting. The indicator mechanism further comprises a connecting means which is connected with the other end of the spring means and which is adapted to be connected with a rotatable gearshifting member, said connecting means moving either with or against the bias of said spring means in response to movement of the gearshifting member to effect different transmission settings whereby the pointer is moved distances across the dial less than the distances moved by the connecting means.

1 Claim, 6 Drawing Figures

Patented June 19, 1973

3,739,741

INVENTOR.
William J. Freyermuth
BY
W. A. Schuetz
ATTORNEY

TRANSMISSION GEARSHIFT INDICATOR

The present invention relates to an indicator mechanism for a transmission control system and more particularly to an indicator mechanism for a transmission control system wherein the movement of a pointer across a dial provides a visual indication of the transmission setting.

Transmission gearshift indicators have heretofore been provided which are mounted with other gauges and similar indicating devices; such as those indicating coolant temperature, fuel supply, oil pressure, etc., in instrument clusters upon the instrument panels of automotive vehicles for the visual inspection of the operator of the vehicle. Further, transmission gearshift indicators mounted upon the instrument panel of the vehicle have heretofore been provided which comprise an indicator pointer which is spring biased in one direction along a dial end which is moved by a cable to different positions along the dial in response to movement of a gearshifting member to effect different transmission settings and wherein the cable is connected therewith in opposition to the spring means. For example, see U. S. Pat. No. 2,925,061. Because of the wide variety and large numbers of gauges and indicating devices available and required on instrument panels in automotive vehicles, problems can be encountered in attempting to provide an instrument cluster design which is sufficiently compact to provide easy visual inspection for the operator of the vehicle. For this reason, it can be desirable to provide gauges and indicating devices which are as compact as possible. More specifically, a problem encountered in providing a compact transmission gearshift indicator of the type described is reducing the rate of travel of the indicating pointer, which is a function of the movement of the gearshifting member, in order that the size of the dial can be reduced. With this in mind, the present invention provides a transmission gearshift indicator wherein the pointer is moved distances across the dial that are less than the distances moved by the gearshifting member.

Accordingly, an object of the present invention is to provide a new and improved transmission gearshift assembly for a transmission control system wherein the indicator mechanism comprises a support means with a dial associated therewith with spaced representations corresponding to different transmission settings, a spring means which has one end fixed relative to the support means, a pointer which is mounted between the ends of the spring means and which projects adjacent the dial, and a connecting means which is connected with the other end of the spring means and which is adapted to be connected with a rotatable gearshifting member. The connecting means moves either with or against the bias of the spring means in response to movement of the gearshifting member to effect different transmission settings whereby the pointer is moved distances across the dial less than the distances traveled by the connecting means.

Another object of the present invention is to provide a new and improved transmission gearshift indicator as described in the preceding object and wherein the pointer has its lower end pivotally supported upon the support means in addition to being mounted upon the spring means so that the pointer is pivoted in opposite directions across the dial.

Yet another object of the present invention is to provide a new and improved transmission gearshift indicator as described in the first object and wherein the spring means comprises a torsion spring which is positioned in a concentric manner about the transmission shift tube so that the pointer is pivoted in opposite directions across the dial.

These and other objects of the invention will become more fully apparent from the following description and drawings wherein.

Figure 1:
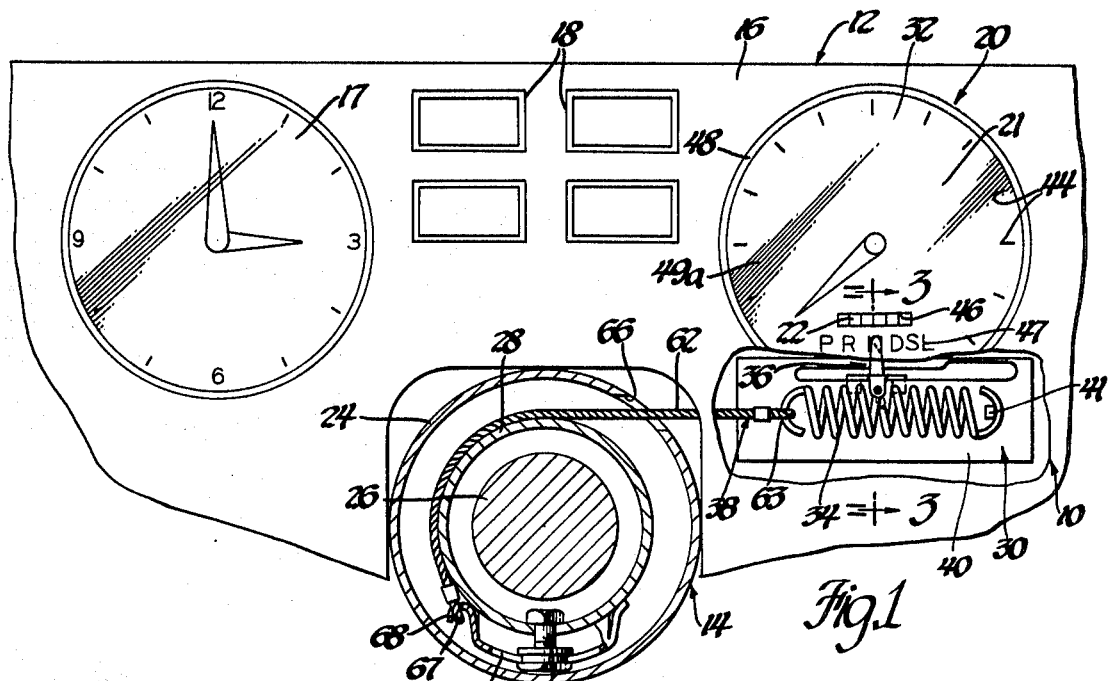
FIG. 1 is a fragmentary front elevational view of a vehicle instrument panel embodying the transmission gearshift indicator of the present invention.

As representing a preferred embodiment of the present invention, the drawings show a transmission gearshift indicator 10 which is mounted upon an instrument panel 12 of an automotive vehicle (not shown) at a position immediately adjacent a steering column apparatus 14 of the vehicle. The instrument panel 12 includes an escutcheon 16 which is mounted thereto at a position immediately above the steering column apparatus 14. The escutcheon 16 is shown as having a clock or tachometer 17 and a first cluster of gauges and instruments 18 which are suitably mounted thereon at a location directly above the steering column apparatus 14 and which could include gauges indicating the status of the coolant temperature, oil pressure, fuel supply, parking brake, etc. The escutcheon panel 16 is also shown to have mounted thereto a second cluster of gauges and indicating devices 20 herein shown as a suitable speedometer 21, a suitable odometer 22, and the transmission gearshift indicator 10 of the present invention.

The steering column apparatus 14, which can be of any suitable variety, is herein shown as including an outer mast jacket 24 which is supported upon a bracket (not shown) which is in turn attached to the vehicle adjacent the underside of the instrument panel 12. The mast jacket 24 serves as a base for supporting the other components of steering column apparatus 14. The steering column apparatus 14 is shown to further include a steering shaft assembly 26 which has its upper end supporting a conventional steering wheel (not shown) and its lower end received within a housing of the steering gear (not shown).

The steering column apparatus 14 further includes a rotatable gearshifting member or shift tube 28 which is rotatably supported within the mast jacket 24 in a concentric relationship between the mast jacket 24 and the steering shaft assembly 26. The upper end of the shift tube 28 has a conventional manual transmission shift lever (not shown) supported thereon and the lower end of the shift tube 28 is mounted within an adapter and is operatively connected via appropriate linkage to the vehicle transmission (not shown). In this respect, rotation of the shift tube 28 by the shift lever between its various settings, which correspond to the different settings of the transmission, serves to effect different settings of the transmission.

In the preferred embodiment, the transmission gearshift indicator 10 broadly comprises a support means 30 with a dial 32 associated therewith with spaced representations corresponding to the different transmission settings, a spring means 34 which has one end fixed to the support means 30, a pointer 36 which is mounted between the ends of the spring means 34 and which projects upwardly to a location adjacent the dial 32, and a connecting means 38 in the form of a cable connected between the other end of the spring means 34 and the shift tube 28.

Figure 2:
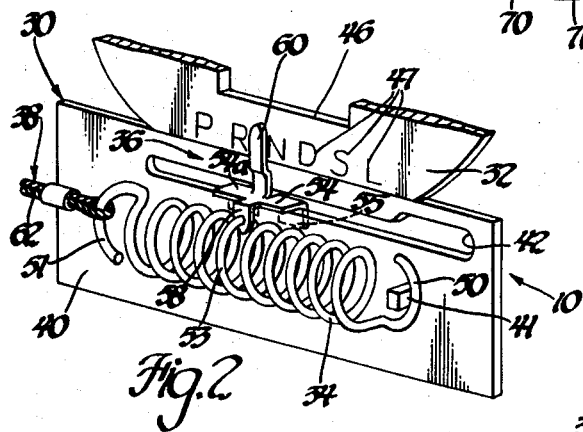
FIG. 2 is an enlarged fragmentary perspective view of a part of the transmission gearshift indicator of the present invention.
Figure 3:
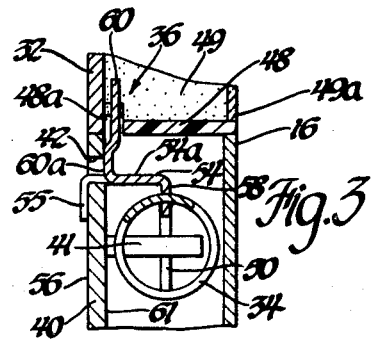
FIG. 3 is an enlarged cross-sectional view of a part of the transmission gearshift indicator of the present invention and taken along line 3—3 of FIG. 1.

Referring to FIGS. 2 and 3, the support means 30 generally comprises a flat, rectangular base member 40 which is integral with the lowermost portion of the dial 32 and which has a projection 41 extending outwardly therefrom. The support means 30 also has an elongated, horizontal guide slot 42 therethrough.

The dial 32 is generally circular in shape and serves as a dial for the second instrument cluster 20. The face side of the dial 32 has an arcuate speedometer scale 44 that is graduated in miles per hour and which extends adjacent the outer periphery of the dial for approximately 270°. The dial 32 also includes a narrow, rectangular slot 46 in its central portion and behind which is mounted the odometer 22. The dial 32 also includes a series of spaced representations 47 corresponding to the different settings of the transmission and which are positioned in a horizontal relationship at the lowermost portion of the face side of the dial 32 and between the ends of the speedometer scale 44. The escutcheon panel 16 of the instrument panel 12 has a circular, annular wall 48 which projects rearwardly therefrom and defines an aperture 49 therein. The wall 48 is shaped generally complementary to the dial 32, and the dial 32 is fixedly mounted thereon in an abutting relationship to provide a recessed effect. Further, a transparent plastic window 49a is positioned within the aperture 49 and adjacent the escutcheon 16 to protect the second instrument cluster 20.

The spring means 34, as shown in FIGS. 1 and 2, is a coiled compression spring. The spring means 34 has two end portions 50 and 51 which are hook or U-shaped and has the end portion 50 positioned about the projection 41 of the support means 30.

The pointer 36 of the transmission gearshift indicator 10 is fixedly attached to one of the coils 53 of the spring means 34 and is slidably supported upon the dial 32 for horizontal, rectilinear travel along the spaced representations 47 of the dial 32. The pointer 36 comprises an L-shaped base portion 54 which has one leg 54a extending horizontally through the guide slot 42 in the dial 32 and which has its other downwardly extending leg 55 abutting the backside 56 of the support means 30 for sliding engagement therewith. In this respect, the leg 54a of the pointer 36 cooperates with the support means 30 to locate and maintain the pointer 36 in a proper vertical position relative to the spaced representations 47.

Integral with the leg 54a of the base is a downwardly extending bifurcated portion 58 which is crimped about one of the coils 53 of the spring means 34 to fixedly attach the pointer 36 to the coil 53 for travel therewith. The pointer 36 also includes an indicator needle or finger 60 which projects upwardly from the center of the leg 54a of the base 54 and through a slot 48a in the lower portion of the wall 48 to a location immediately adjacent the spaced representations on the dial 32. The needle 60 has its lower portion 60a slidably engaged with the face side 61 of the support means 30. The engagement between the leg 55 and the lower portion 60a of the needle 60 with the backside 56 and frontside 61 of the support means 30, respectively, retains the pointer 36 in an upright position and serves to guide the pointer for sliding rectilinear movement adjacent the spaced representations 47.

The connecting means 38 comprises a double strand cable 62 which is connected to the spring means 34 and the shift tube 28 to act in opposition to the bias of the spring means 34 and control the positioning of the pointer 36 adjacent different ones of the spaced representations 47 in response to rotation of the shift tube 28. The cable 62 has one end 63 formed in a loop which is received upon the hooked end portion 51 of the spring means 34. The cable 62 extends from the end portion 51 of the spring means 34 through a slot 66 in the mast jacket 24 of the steering column 14 and is partially wrapped about the outer periphery of the shift tube assembly 28, as shown in FIG. 1. The other end 67 of the cable 62 is also formed as a loop and serves as a detachable connection with a hook 68 on an adjusting clip 70 which is secured to the outer periphery of the shift tube 28 by a bolt 71.

In operation and assuming the transmission gearshift indicator 10 to be in its neutral position as shown in FIGS. 1 and 2, rotation of the shift tube 28 in a clockwise manner allows the bias of the spring means 34 to move the pointer 36 and its needle indicator 60 rightwardly along the spaced representations 47 of the dial 32. Further, counterclockwise rotation of the shift tube assembly 28 serves to move the pointer 36 and its needle indicator 60 leftwardly along the spaced representations 47 of the dial 32 and against the bias of the spring means 34. As is well known to those skilled in the art, the distance moved by the pointer 36 and its needle indicator 60 along the spaced representations 47 of the dial 32 is less than the distance moved by the cable 62 and the shift tube 28 because the pointer 34 is mounted upon the expansible coils 53 of the spring means 34 between the fixed end portion 50 and the movable end portion 51 which travels the same distance as the cable 62. It should be understood that the expansion of the spring means 34 serves to take-up the travel of the cable 62 and that the actual distance moved by the pointer 34 is some value less than the distance moved by the movable end 51 of the spring means 34 and some value greater than zero depending upon which of the coils 53 the pointer 36 is mounted upon. For example, if the pointer 36 is affixed to one of the coils 53 closer to the fixed end 50 of the spring means 34 rather than the movable end 51, the distance moved by the pointer 36 will have a value closer to zero, however, if the pointer 36 is affixed to a coil closer the movable end 51 rather than the fixed end 50 of the spring means 34, the distance moved by the pointer 36 will be closer to the distance moved by the movable end 51 and cable 62. The pointer 36, as shown in FIGS. 1 and 2, is positioned approximately halfway between the end portions 50 and 51 of the spring means 34 and will be caused to move approximately one-half the distance moved by the cable 61 upon rotation of the shift tube 28. Further, it should be understood that the pointer 36 could be positioned between or adjacent the ends of two or more springs having the same or different spring coefficients to produce the same effective result, movement of the pointer some distance less than that distance moved by the cable 62. It should be readily apparent that the pointer 36 and its needle indicator 60 are, in this manner, moved along the spaced representations 47 on the dial 32 and are positioned adjacent the proper one of the representations 47 corresponding to the transmission setting in order to provide a visual indication of the transmission setting.

Figure 4:
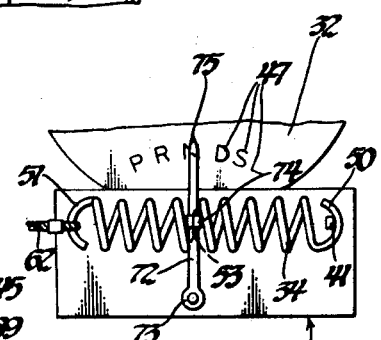
FIG. 4 is a fragmentary front elevational view of another embodiment of the transmission gearshift indicator of the present invention.

Now referring to FIG. 4, another embodiment of the present invention is shown where like numbers indicate similar parts to that embodiment previously described. In this embodiment, the spaced representations 47 on the dial 32 are formed in an arcuate pattern, and the pointer 72 is a needle which is pivotally supported at its lower end 73 upon the support means 30. Further, pointer 72 is attached between its ends to one of the coils 53 of the coiled spring means 34 by any suitable means, preferably a strip of malleable metal 74 which is crimped around one of the coils 53 and the pointer 72. The operation of this embodiment is similar to that previously described, however, the pointer 72 is pivoted across the spaced representations 47 of the dial 32 rather than horizontally or rectilinearly. It should also be noted that the reduction of the travel of the pointer 72 is a function of both the coil 53 to which the pointer 72 is attached, as was previously described, and the position between its ends at which the pointer 72 is attached to the coil 53 of the spring means 34. For example, if the pointer 72 is attached adjacent its lower end 73 to one of the coils 53 of the spring means 34, the angular distance moved by the pointer 72 will be significantly greater than if the pointer 72 has been attached adjacent its upper end 75 to one of the coils 53 of the spring means 34.

Figure 5:
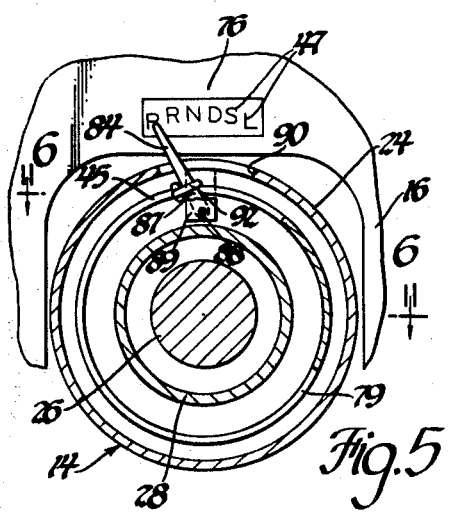
FIG. 5 is a fragmentary front elevational view with portions shown in section, of an instrument panel of an automotive vehicle embodying yet another transmission gearshift indicator of the present invention.
Figure 6:
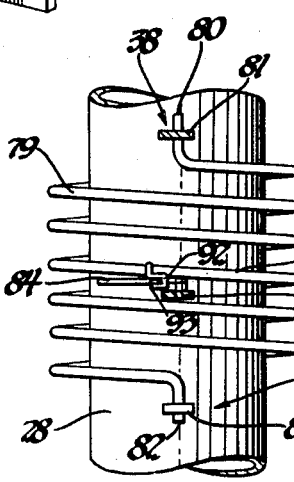
FIG. 6 is a sectional view taken along line 6—6 of FIG. 5.

Now referring to FIGS. 5 and 6, yet another embodiment of the present invention is shown where like numbers indicate similar parts to those embodiments previously described. In this embodiment, a transparent dial 76 is positioned immediately above the steering column 14 and within the escutcheon panel 16. The spaced representations 47 are again positioned in an arcuate pattern, and a torsion spring 79 is mounted in a concentric manner about the shift tube 28 with one end 80 received within an aperture (not shown) in a member 81 projecting radially inwardly from the inner periphery of the mast jacket 24 and with its other end 82 received within an aperture (not shown) in a member 83, which is the connecting means 38, projecting radially outwardly from the outer periphery of the shift tube 28. In this manner, the one end 80 of the torsion spring 79 is fixed relative to the support means 30, now comprising the mast jacket 24 and escutcheon 16, while the other end 82 rotates with the shift tube 28. The pointer 84 has its lower end portion 87 pivotally supported via pivot pin means 88 upon a member 89 which extends readially inwardly from the inner periphery of the mast jacket 24. The pointer 84 is attached to the torsion spring 79 by a clip 92 which is attached to one of the coils 45 in a suitable manner, preferably by crimping. The clip 92 has a rectangular opening 93 therein and through which the pointer 84 extends. The opening in the clip 92 is oversize with respect to the cross-sectional area of the pointer to allow the pointer 84 to slide relative to the clip as it is pivotally moved by the torsion spring. The pointer 84 extends through a circumferential slot 90 in the mast jacket 24 and projects to a position immediately adjacent the dial 76. The torsion spring 79, as supported about the shift tube 28, is in a spring loaded state with the bias of the spring 79 in either a clockwise or counterclockwise direction about the shift tube 28. Since the torsion spring will wind or unwind at the end 82 at a faster rate than at the coils 47, rotation of the shift tube assembly 28 results in the pointer 84 pivoting an angular distance across the spaced representations 47 less than the angular distance traveled by the connecting member 83 and the shift tube 28.

It should also be understood that the pointer 84, rather than having its lower end portion 87 pivotally supported upon the pivot pin means 88, could have its lower end portion 87 fixedly supported upon one of the coils 45 of the torsion spring 79 in a suitable manner, such as by crimping, to result in a similar pivoting of the pointer 84 through angular distances across the spaced representations 47 less than the angular distance traveled by the connecting member 83 and the shift tube 28.

From the foregoing, it should be apparent that the gearshift indicators of the present invention are of a relatively simple and compact construction because the smaller distances moved by the pointers relative to the distances moved by the connecting means allows similar dials to be used.

The foregoing disclosure relates to several embodiments of the invention and which may be modified within the scope of the appended claims.

What is claimed is:

1. An indicator mechanism, for a vehicle transmission control system having a transmission shift tube which is supported within the vehicle steering column and which is rotatable to a plurality of positions by a gear shift lever to effect different transmission settings, comprising: a support means having a dial on its front side with spaced representations in a horizontally aligned relationship and corresponding to different transmission settings, said support means having a generally horizontal guide slot immediately below said spaced representations; an expansible spring having a plurality of coils and one end affixed to said support means; a pointer having a base portion including a first depending leg which is crimped to a coil of said spring intermediate the ends of the latter, said base portion of said pointer extending through said horizontal guide slot of said support member and having a second depending leg in sliding engagement with said support means on its back side, said pointer having a needle extending upwardly from said base portion and located adjacent said front side of said dial to provide a visual indication of the transmission setting; a cable having one end connected with the other end of said spring to act in opposition to the bias thereof and having its other end connected with the shift tube, said cable when moved in response to rotation of the shift tube in first and second opposite directions respectively causing and allowing said spring to expand and contract to linearly move said pointer to effect different transmission settings and with pointer moving linear distances across said dial which are less than the distances moved by said cable in response to rotation of the shift tube.

* * * * *